United States Patent [19]

Winters

[11] 4,412,130
[45] Oct. 25, 1983

[54] DOWNHOLE DEVICE TO DETECT DIFFERENCES IN FLUID DENSITY

[75] Inventor: Warren J. Winters, Tulsa, Okla.

[73] Assignee: Standard Oil Company, Chicago, Ill.

[21] Appl. No.: 253,466

[22] Filed: Apr. 13, 1981

[51] Int. Cl.³ .............................................. G01V 5/00
[52] U.S. Cl. ..................................... 250/260; 250/265
[58] Field of Search ............... 250/253, 254, 256, 262, 250/265, 264, 259, 260; 378/54

[56] References Cited

U.S. PATENT DOCUMENTS

| | | | |
|---|---|---|---|
| 2,965,753 | 12/1960 | Reynolds et al. | 250/265 |
| 3,123,709 | 3/1964 | Caldwell et al. | |
| 3,488,629 | 1/1970 | Claycomb | |
| 3,555,504 | 1/1971 | Fields | |
| 3,617,746 | 11/1971 | Janssen et al. | |
| 3,688,115 | 8/1972 | Antkiw | 250/265 |
| 3,713,089 | 1/1973 | Claycomb | 340/18 LD |
| 4,297,575 | 10/1981 | Smith, Jr. et al. | 250/265 |

*Primary Examiner*—Janice A. Howell
*Attorney, Agent, or Firm*—Scott H. Brown; Fred E. Hook

[57] ABSTRACT

Apparatus for use within a well for indicating the difference in densities between two well fluids. The apparatus is formed within a drill collar with a source of radiation removably disposed in a wall of the drill collar. At least two radiation detectors are located equidistant from the source of radiation with one detector adjacent an interior central bore through the drill collar and a second detector is adjacent the exterior of the drill collar. Two fluid sample chambers are spaced between the source of radiation and the detectors, respectively; one chamber for diverting fluid from the bore and the other chamber for diverting fluid from the annular space between the drill bore and the drill collar. Suitable circuitry is connected to the detectors for producing a differential signal substantially proportional to the difference in radiation received at the two detectors. The difference in the density between fluid passing through the drill collar and returning through the annular space is detected and indicated by the apparatus for early detection and prevention of blowouts, as well as, for use with measurement-while-drilling (MWD) systems.

12 Claims, 2 Drawing Figures

DOWNHOLE DEVICE TO DETECT DIFFERENCES IN FLUID DENSITY

BACKGROUND OF THE INVENTION

1. Field of the Invention

The present invention relates to an apparatus for detecting and indicating the difference in densities between two well fluids and, more particularly, to a detection apparatus within a drill collar for use within a well.

2. Setting of the Invention

In rotary drilling of oil and gas wells, the key to safe well control is an early detection of a downhole "kick" (fluid influx into the annular space between the drill collar and the wellbore) so that appropriate prevention procedures can be initiated to avoid a possible blowout. The most positive surface indication of a kick is a net gain in the mud volume returned from the well compared to the volume pumped downhole through the drill string; however, gas kicks are often difficult to recognize because gas is highly compressed at typical bottomhole pressures. Thus, the mud system gains little additional volume until the compressed gas present in the drilling fluid has been circulated uphole to relatively shallow depths where it undergoes rapid expansion; however, by this point, a large gas kick is often impossible to control if well-kill procedures have not already been initiated. In addition, oil-based muds pose a particular problem because natural gas is highly soluble in the diesel oil phase common to such muds. This means that at the onset of a kick, a considerable volume of gas can dissolve in the mud with little or no detectable volumetric gain at the surface for a considerable time to come, that is, until the gas-impregnated mud arrives at or near the surface.

In addition, obtaining various measurements at the bottom of a borehole during the course of drilling operations have become beneficial. Many commercial devices are now available which contain information at or adjacent the drill bit, such as the weight on the bit, the torque on the drill string, inclination or azimuthal direction of the borehole, borehole pressure, temperature, and other parameters, which are transmitted by telemetry to the surface for use by the drilling operators. These telemetry systems are now available for signaling data from the region adjacent the drill bit, for example, the drill collar, to the surface of the earth. For example, U.S. Pat. No. 3,713,089 of Claycomb discloses a pressure signaling system providing encoded representations of data measured at or near the drill bit which are sent up the well to the surface where the pressure pulses are detected and converted into meaningful indications or records by suitable surface apparatus, for example, those disclosed in U.S. Pat. Nos. 3,488,629 and 3,555,504. None of this series of patents reveals what is measured at the bottom of the well, although the first-mentioned patent does disclose measuring the weight of the drill bit, the drill string torque, the inclination and the azimuthal direction of the borehole, borehole pressures and temperatures, as well as, various characteristics of the formation being penetrated. There is no discussion within this series of patents relating to measuring the differential densities of the annular fluid and the drill pipe fluid for detecting gas or liquid kick.

There are numerous patents dealing with measurement of radioactivity in electrical well logging; however, since these patents are all discussing the ordinary forms of well logging, it is apparent that none are capable of measuring the differential density between the annular fluid and the drill pipe fluid.

It has been known before to measure the change in gamma radiation received at a detector when a source of radiation has been spaced at some appropriate distance from it, so that variations in the received gamma ray signal are indications of the density of the fluid. U.S. Pat. No. 3,123,709 of Caldwell and Sippel and U.S. Pat. No. 3,617,746 of Janssen, et al., are of interest as disclosing logging means for determining density of fluid in a well, but there is no mention therein for measuring differential densities of well fluids for detection of gas or liquid kicks.

SUMMARY OF THE INVENTION

The present invention contemplates a novel apparatus for detecting differences in densities of two well fluids, designed and constructed for overcoming the foregoing disadvantages. The novel apparatus comprises a housing formed within a drill collar, which is attached to a drill string by any conventional means, a source of radiation removably disposed within the wall of the drill collar, a plurality of radiation detectors mounted within the drill collar equidistant from the source of radiation, and at least two fluid sampling chambers within the drill collar equidistant between each of the radiation detectors and the source of radiation. One of the fluid sampling chambers is in communication with an interior central bore of the drill collar and the other chamber is in communication with the annular space between the drill collar and the wellbore. Each of the detectors upon energization produces an electrical signal directly related to the density of the well fluid in the chamber to which the detector is adjacent. The detectors are connected to a circuit which is responsive to these signals from the detectors and produces an indication directly related to the differences in densities of the fluid in the drill collar and the fluid in the annular space so that a rapid decrease of fluid density in the annular space may be indicated.

In operation, the apparatus is run downhole and may be connected to a measure-while-drilling (MWD) telemetry system. In the event that a "gas kick" is occurring, a net gain in the mud volume returned from the well compared to the volume pumped downhole through the drill string may be detected. Usually on the onset of the kick, a considerable volume of gas may be dissolved within the mud with little or no detectable volumetric gain at the surface. When the kick occurs, the differences between the density in the fluid in the drill string and the lighter gas-entrained fluid passing through the annular space suddenly changes. This change is indicated at the surface so that appropriate blowout prevention procedures may be initiated. The procedure is the same for detecting liquid kicks in that the annular fluid density is less than the drilling fluid density.

DETAILED DESCRIPTION OF THE PREFERRED EMBODIMENT

Figure 1:
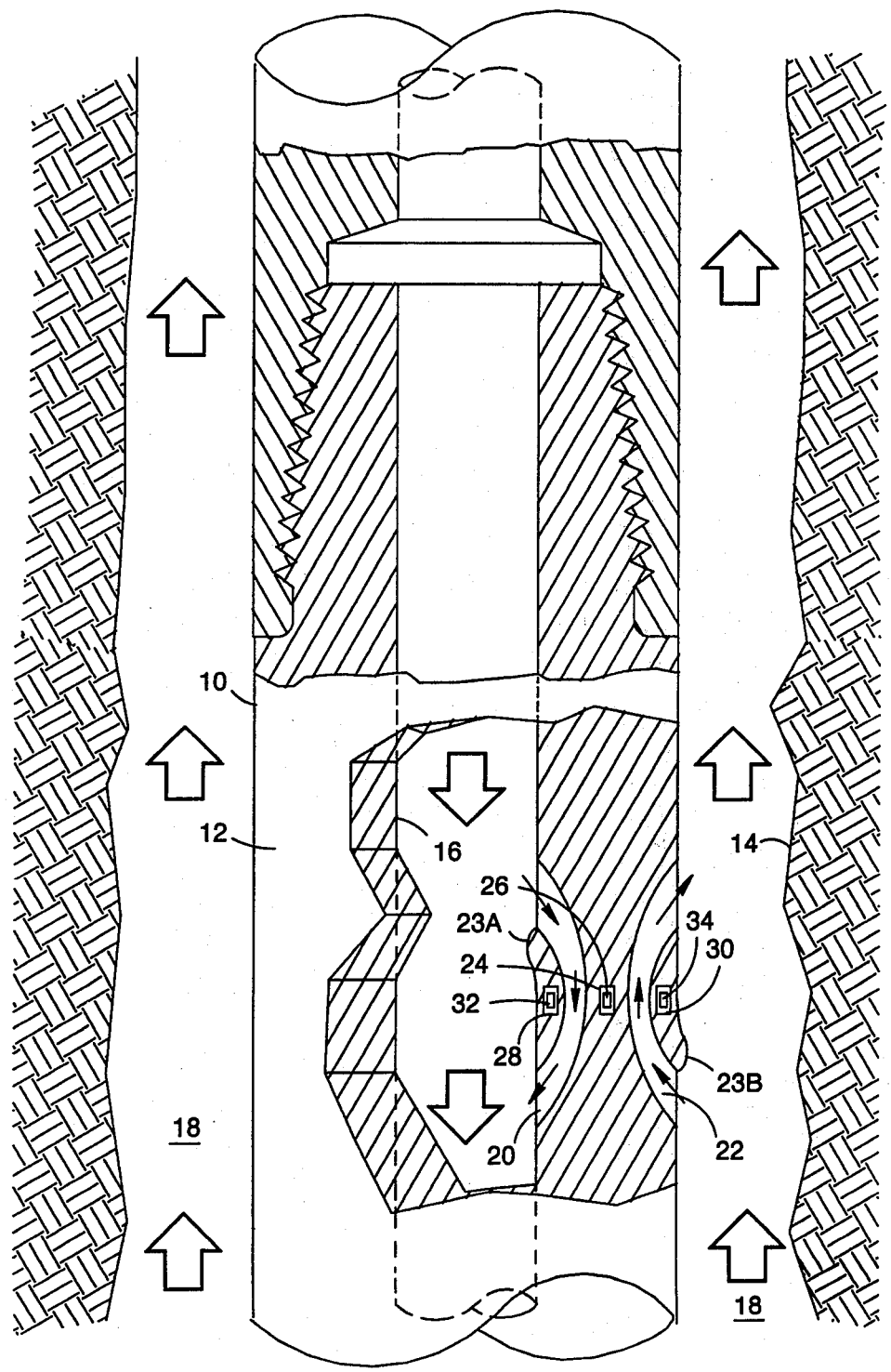
FIG. 1 is an elevational cutaway view of a part of a drill collar carrying a source of gamma radiation and two detectors embodying features of the present invention.

Referring to the drawings in detail, reference character 10 generally indicates a device to detect rapid increase in density differential between fluid passing through the drill string and fluid passing upwardly through the annular space around the drill string. As shown in FIG. 1, the device 10 is formed a part of or is connected to a drill collar 12 within a drill string penetrating a bore 14 of a drilling well. Through a central bore 16 of the drill collar 12 drilling fluid is pumped from the surface through the drill string and through the drill bit (not shown) to circulate the fluid up in the annular space 18 between the drill collar 12 and the bore 14 at the well as is common in the drilling art.

The device 10 includes two curved side channels or sampling chambers 20 and 22 which are provided by any suitable machining technique in the collar 12. The channels 20 and 22 provide two fluid sample chambers through which drill pipe fluid and annular fluid are passed, respectively, as shown by the direction of the arrows in FIG. 1. A lip portion 23A of the collar 12 extends partially out into the bore 16 adjacent the mouth of the channel 20 to aid in the entry and passage of fluid through the channel 20. A lip portion 23B of the collar 12 extends partially out into the annular space 18 adjacent the mouth of channel 22 to aid in the entry and passage of the fluid through the channel 22.

In a central watertight aperture 24 intermediate to the fluid sample chambers formed by the channels 20 and 22 is located a source of gamma radiation 26. Any suitable source of radiation may be included herein but for the purposes of this discussion it will be assumed that the source of radiation will produce gamma radiation. Two watertight cavities 28 and 30, each containing essentially identical radiation detectors 32 and 34, are provided in the collar 12 equally horizontally spaced from the source of radiation 26. These detectors 32 and 34 may be solid state ionization gauges which produce a signal approximately directly proportional to the quantity of gamma radiation reaching the detectors. The detectors 32 and 34 are operably connected through circuit means to telemetering equipment (not shown) on the surface (as will be described hereinbelow). As can be seen from FIG. 1, the radiation detectors 32 and 34 are located with respect to the radiation source 26 such that the amount of metal lying in the radiation paths is approximately the same in both cases.

Ideally, the response of the radiation detectors 32 and 34, i.e., the initial signal, should be essentially the same when the same drilling fluid flows through the channels 20 and 22. For the same reason, the cross-sectional area of the channels 20 and 22 in the region of interest is approximately identical. The shape of the paths of the two channels 20 and 22 is such that it tends to insure that there is a continuous sampling of the drill pipe fluid in the central opening 16 and of the annular fluid circulating in the annular space 18.

Figure 2:
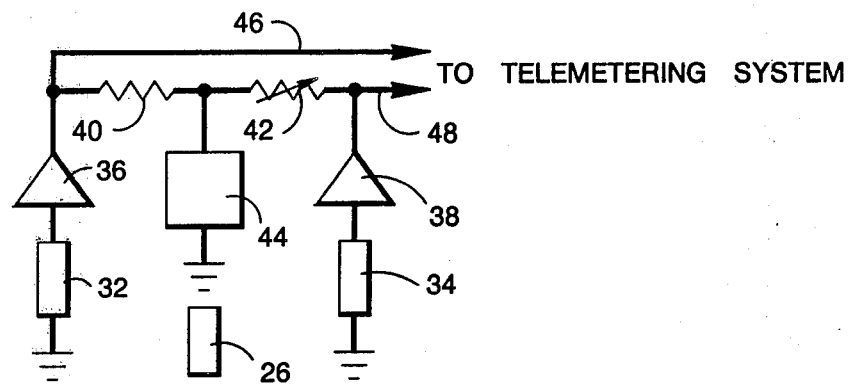
FIG. 2 is a schematic diagram of a portion of the circuit employing differential fluid density measurements for use in the present invention.

The circuit means is shown schematically in FIG. 2. As shown in FIG. 2, the two detectors 32 and 34 are connected through stable, solid state amplifiers 36 and 38 to an output network consisting of loads or resistors 40 and 42, respectively. The resistor 42 is an adjustable resistor so that for calibration purposes it is possible when the amplifiers 36 and 38 are connected to a suitable power supply 44, such as a dry cell battery, and drilling fluid of essentially equivalent density circulates through each of the channels 20 and 22 that the output across leads 46 and 48 will be essentially zero. When this arrangement is obtained, it is found that for ordinary ranges of output of the power supply 44 the signal across the the leads 46 and 48 will be almost linearly proportional to the difference in densities between the liquids flowing through channels 20 and 22, that is, to the differential density between the annular fluid and the drill pipe fluid.

By using a radiation source having a relatively long half-life, such as Cesium 137 or Cobalt 60, the changes in gamma radiation from the source 26 will not influence the output signal across the terminals 46 and 48. The power supply 44 is removably connected within the drill collar 12 by any suitable means for easy removal thereof when it is necessary to renew the power supply 44. Also the radiation source 26 is replaceable when it has reached the lower end of its usefulness.

A notable advantage of this device is that it contains a single gamma radiation source 26 and is based on detecting differences in magnitude in measuring the absolute levels of radiation transmitted along the path between the source 26 and the detectors 32 and 34. This gives the system maximum sensitivity while minimizing recalibration due to, among other things, the natural decay of the radioactive source 26 or changes in the power supply 44. The detectors 32 and 34 can be checked for parity whenever the tool is pulled from the hole for a bit change. It also is to be noted that this design is compatible with modern day monitoring-while-drilling tools which are incorporated into drill collars. Again, it is to be noted that the radiation levels across the channels 20 and 22 are ordinarily of sufficient magnitude so that it is unnecessary to consider any effects from natural gamma radiation in the subsurface area.

It is readily apparent that electrical signals from the terminals 46 and 48 may be used with any modern telemetry systems. The downhole telemetering system forms a vital link in transmitting the differential fluid density to the surface for use by the driller and does not comprise a part of this invention so there is no detailed description herein. If desired, an alternating current rather than a direct current output signal can be obtained either by putting the output leads 46 and 48 to a chopper (not shown), as in drift-free voltmeters, or by employing an alternating current source.

In operation, the differences in densities between the fluid flowing through the drill collar 12 and up through the annular space 18 should be approximately equal and thereby the densities of the fluids passing through the channels 20 and 22 should be approximately equal. In the event that a rapid surge of gas or liquid becomes entrained within the mud flowing through the annular space 18 starting what is called a gas or liquid kick which may lead to a possible blowout, the density of the mud or fluid flowing through the annular passage 18 becomes measurably less than the density of the fluid passing through the drill string. When such fluid passes through the passage 22 and is measured and detected by the detector 34 and the difference between the two densities is past a threshold point, then this indication is given to the surface through the telemetering system and appropriate well-kill or blowout prevention procedures may be quickly initiated.

There are other useful applications for the gamma radiation device 10 in addition to the detection of gas influx to the wellbore. For example, the device 10 provides an indication of where heavier-weight "kill" mud has been pumped as far as the inner channel 20 and then again when the mud has entered the wellbore 14 and moved up the annular space 18 until it is opposite the channel 22. This is particularly important since at best the handling of kill mud is sometimes difficult to accomplish. Some well-kill procedures entail "reverse circulation", i.e., pumping fluid down the annular space 18, through the drill bit, and up the wellbore 14. The device 10 may be used with this form of well-kill procedure as well.

It is also apparent the device 10 readily indicates bottomhole cleaning efficiency of the drilling fluid and bit hydraulics. This bottomhole cleaning is a major concern in drilling, totally aside from the detection of the influx of gas or liquid. Under steady state conditions, the output reading of the device 10 is directly related to the quantity of drilled cuttings which are present in the conduit 22 and which, of course, are not present in conduit 20, so that the output reading directly indicates the concentration of the drilling cuttings and therefore gauges the bottomhole cleaning efficiency of the drilling mud in bottomhole hydraulics.

It also should be apparent the device 10 can readily detect lost circulation ("thief") zones in the vicinity of the bit while drilling. In this case, there is an increase in annular fluid density as a result of higher drilled concentrations (lost fluid enters the formation but the associated cuttings do not). The same effect results from the undesirable case of drilling into an enlarged or cavernous zone of the earth (either natural or induced). When encountering a thief zone, the output across the terminals 46 and 48 reverses phase or polarity when the fluid density through the channel 22 becomes low compared to that through the channel 20. It is known, of course, that loss of circulation is sometimes a precursor to severe blowouts, for example, the IXTOC blowout in the Gulf of Campeche, Mexico, in 1979.

The device 10 may also be used as a density device for the special case of air drilling in which air or an aerated foam is the fluid circulated to cool the bit and to lift cuttings from the borehole. Air is a compressible medium and expands (becomes less dense) as it exits from the bit. The determination of pressure drop through the bit (which can be accomplished by the device 10 while not drilling) and the determination of drilled cuttings concentrations and densities in the vicinity of the bit (accomplished while drilling) is critical to air drilling calculations currently being advanced.

The device 10 may also be modified to include pressure transducers mounted on the surfaces of the flow channels 20 and 22. The transducers would provide differential pressure measurements which may be used to provide information about pressure drop surrounding the bit for both gas and liquid fluid media, aid in locating lost circulation zones via the practice of "short tripping", and sense the onset of a kick occurring in an upper uncased section of the wellbore by recording the decrease in total annular fluid head. Further, fluid-driven rotors may be placed within the channels 20 and 22 and each coupled to a small dynamo or magnet which in turn is connected to the circuit means within the device 10. This embodiment would provide valuable flow rate data useful in many of the above-mentioned diagnostic measurements.

Whereas the present invention has been described with particular relation to the drawings attached hereto, it should be understood that other and further modifications, apart from those suggested or shown herein, may be made within the scope and spirit of this invention.

What is claimed is:

1. Apparatus for indicating the difference in densities between a first and second fluids, comprising:
    a housing interconnectable with a conduit string and provided with two approximately equal fluid sampling chambers, a first of said chambers in communication with the interior of said housing and a second of said chambers in communication with the exterior of said housing;
    said first fluid passing interiorly of said housing and said second fluid passing exteriorly of said housing;
    a radiation source mounted within said housing equidistant between said first and second chambers;
    at least two radiation detectors mounted within said housing equidistant from said radiation source with one of said chambers equidistant between one of said radiation detectors and said radiation source;
    each of said detectors upon energization produces a signal directly related to the density of the fluid in said chamber to which said detector is adjacent; and
    circuit means operably connected to said detectors and responsive to said signals for producing an indication directly related to the difference in densities of said fluids.

2. Apparatus as in claim 1 wherein said fluids are well fluids.

3. Apparatus as in claim 1 wherein said apparatus is for use within a well.

4. Apparatus as in claim 1 wherein said radiation source produces gamma radiation.

5. Apparatus as in claim 2 wherein said housing is a tubular drill collar having a central bore therethrough where said first fluid sampling chamber is in communication with said central bore.

6. Apparatus as in claim 5 wherein said fluid sampling chambers are vertical fluid channels.

7. Apparatus as in claim 5 wherein said housing is provided with connection means for removable connection to a drill string.

8. Apparatus as in claim 5 wherein said second fluid sampling chamber is in communication with fluid flowing in the annulus about said drill collar.

9. Apparatus as in claim 1 wherein said circuit means includes a coupling circuit connected differentially to said detectors and including an energizing source for said detectors, by which an output signal is produced directly related to the difference in output of said detectors, and said output circuit is connected to said coupling circuit and responsive to said output signal for producing an indication directly related to the difference in densities of said fluids.

10. Apparatus as in claim 9 wherein said coupling circuit includes two essentially identical amplifiers, each of which is connected to only one of said detectors and in which the output of said amplifiers are individually connected to one side of two load impedances, the other sides of which are connected together to said energizing source, and in which said output circuit is connected to the output of the said two amplifiers.

11. Apparatus as in claim 1 wherein each of said detectors is a solid state detector of gamma radiation, and in which the amount of amplification of each of the signals from said two radiation detectors is adjustable relative to the other, whereby it is possible to so adjust said amplification that the output of said output circuit is zero when the average density of said two fluids is equal.

12. The apparatus as in claim 9 wherein the output of said output circuit is connected to the input of a measurement-while-drilling system for transmission to the surface.

* * * * *